(12) United States Patent
Yoshinaga

(10) Patent No.: US 8,964,430 B2
(45) Date of Patent: Feb. 24, 2015

(54) ACTIVE SNUBBER CIRCUIT AND POWER SUPPLY CIRCUIT

(75) Inventor: Mitsutomo Yoshinaga, Saitama-Ken (JP)

(73) Assignee: Sanken Electric Co., Ltd., Niiza-shi, Saitama (JP)

( * ) Notice: Subject to any disclaimer, the term of this patent is extended or adjusted under 35 U.S.C. 154(b) by 256 days.

(21) Appl. No.: 13/018,649

(22) Filed: Feb. 1, 2011

(65) Prior Publication Data
US 2011/0194313 A1    Aug. 11, 2011

(30) Foreign Application Priority Data

Feb. 10, 2010   (JP) ................................ 2010-027982

(51) Int. Cl.
| | | |
|---|---|---|
| H02H 7/10 | (2006.01) | |
| H02M 3/335 | (2006.01) | |
| H02M 1/34 | (2007.01) | |

(52) U.S. Cl.
CPC .... H02M 3/33569 (2013.01); *H02M 2001/342* (2013.01); *Y02B 70/1491* (2013.01)
USPC ..................................................... 363/56.12

(58) Field of Classification Search
CPC ............................................... H03M 3/33569
USPC ........ 363/50, 56.01, 24, 21.01, 21.06, 16, 20,
363/21.08, 21.03, 21.16, 55, 97, 131, 19,
363/56.12, 56.11, 56.04
See application file for complete search history.

(56) References Cited

U.S. PATENT DOCUMENTS

| | | | |
|---|---|---|---|
| 5,570,278 A * | 10/1996 | Cross ............................... 363/20 |
| 6,552,917 B1 * | 4/2003 | Bourdillon ................. 363/21.12 |
| 7,245,087 B2 * | 7/2007 | Nishikawa et al. ........... 315/224 |
| 7,426,121 B2 * | 9/2008 | Hachiya ..................... 363/21.17 |
| 2005/0201128 A1 * | 9/2005 | Jin et al. ..................... 363/56.01 |
| 2006/0119281 A1 | 6/2006 | Nishikawa et al. |
| 2006/0171177 A1 * | 8/2006 | Asao ............................... 363/24 |

FOREIGN PATENT DOCUMENTS

| | | |
|---|---|---|
| JP | 2003-009528 | 1/2003 |
| JP | 2004-147361 | 5/2004 |
| JP | 2004-266955 | 9/2004 |
| JP | 2006-129548 A | 5/2006 |
| JP | 2006-129635 | 5/2006 |

(Continued)

OTHER PUBLICATIONS

Office Action issued in Japanese Patent Application No. 2010-027982, mailed Dec. 6, 2011 (2 pages).

(Continued)

*Primary Examiner* — Gary L Laxton
*Assistant Examiner* — Trinh Dang
(74) *Attorney, Agent, or Firm* — Banner & Witcoff, Ltd.

(57) ABSTRACT

An active snubber circuit for a switching power supply, in which a main switching element repeatedly operates an on-off operation so that current intermittently flows in a primary coil, has a capacitor for surge voltage absorption, a sub-switching element and a sub-control circuit controlling the sub-switching element. A circuit in which the capacitor for surge voltage absorption and the sub-switching element are connected in series is connected in parallel with the primary coil, and the sub-control circuit turns on the sub-switching element for a predetermined time period just after the main switching element is off.

8 Claims, 7 Drawing Sheets

(56) References Cited

FOREIGN PATENT DOCUMENTS

| | | |
|---|---|---|
| JP | 2007-097379 | 4/2007 |
| WO | WO 2006/061924 | 6/2006 |

OTHER PUBLICATIONS

English Translation of an Office Action issued in Japanese Patent Application No. 2010-027982, mailed Dec. 6, 2011 (3 pages).

* cited by examiner

ACTIVE SNUBBER CIRCUIT AND POWER SUPPLY CIRCUIT

CROSS-REFERENCE TO RELATED APPLICATIONS

This application claims priority from Japanese Patent Application No. 2010-027982 filed on Feb. 10, 2010, the entire subject-matter of which is incorporated herein by reference.

BACKGROUND OF THE INVENTION

1. Field of the Invention

The present invention relates to an active snubber circuit and a power supply circuit, and more particularly, to an active snubber circuit and a power supply circuit capable of absorbing and reducing a surge voltage of a switching element that is used in a switching power supply device and the like.

2. Description of the Related Art

Heretofore, in a flyback converter (RCC) circuit, a snubber circuit is connected between primary coils of a flyback transformer so as to absorb and reduce a surge voltage of a main switching element. The snubber circuit includes a passive-type snubber circuit using an RCD snubber or charge accumulating diode and an active clamp-type snubber circuit (active snubber circuit) using a power semiconductor device.

FIG. 6 shows a related art using the RCD snubber circuit. In FIG. 6, an RCD snubber circuit 101 is connected to a circuit 100 that is referred to as a flyback converter. A main switching element 102 repeatedly performs an on-off operation, and excitation energy, which is accumulated in a transformer 103 when the main switching element 102 performs the on operation, is discharged to supply direct current power to a load when the main switching element 102 performs the off operation.

In FIG. 6, the flyback converter circuit 100 has the main switching element 102 such as MOSFET, a diode 104, a capacitor 106 and a main control circuit 109. In addition, the RCD snubber circuit 101 has a diode 105, a capacitor 107 and a resistance 108. Additionally, the transformer 103 has coils 103a to 103c. The main control circuit 109 is input with a voltage obtained by rectifying and smoothing a voltage of the coil 103b by the diode 104 and the capacitor 106. Since the voltage is a voltage proportional to an output voltage, the main switching element 102 is on-off controlled so as to keep a value of the voltage to be constant.

An operation of the related art will be briefly described. At a time of startup, a startup resistance (not shown) in the main control circuit 109 is used to supply energy for startup from an input power source to the main control circuit 109 so as to start a gate driving of the main switching element 102. When the main switching element 102 is turned on, a voltage of the input power source is applied to the coil 103a of the transformer 103, the main switching element 102 becomes turned on and the excitation energy is accumulated in the coil 103a. Further, when the main switching element 102 is turned off by the main control circuit 109, the excitation energy accumulated in the coil 103a is discharged as electric energy through the coil 103c, which is then rectified and smoothed by a diode 110 and a capacitor 111 for smoothing and supplied to a load 112.

When the excitation energy accumulated in the coil 103a is completely discharged through the coil 103c, a voltage waveform, which is freely vibrated by an excitation inductance of the transformer and a stray capacitance of the transformer and the semiconductor device, is generated at the coil 103a. Then, these on and off operations are repeated. Like this, as the main switching element 102 performs the on and off operations, the electric energy is supplied to the load 112.

When the main switching element 102 is turned off, the energy accumulated in a leakage inductance of the coil 103a of the transformer 103 is absorbed on the capacitor 107 of the RCD snubber circuit 101 and is consumed in the resistance 108. Thus, a surge voltage that is applied to the main switching element 102 is suppressed.

FIG. 7 schematically shows a waveform of a voltage applied between a source and a drain of the main switching element 102 of the related art shown in FIG. 6.

As shown in FIG. 7, when the RCD snubber circuit 107 is used, the surge voltage cannot be sufficiently suppressed, so that EMI (Electromagnetic Interference) is increased.

JP-A-2006-129548 discloses a related-art power supply circuit using an active snubber circuit. The related-art power supply circuit disclosed in JP-A-2006-129548 is a power supply circuit that uses current resonance to perform power delivery, has a series circuit of a main switching element and a sub-switching element connected both ends of a direct current power source, a transformer, main and sub control circuits and a series circuit of a condenser and an inductance between mutual connection points of the main switching element and the sub-switching element. The related-art power supply circuit disclosed in JPA-2006-129548 alternately turns on and off the main switching element and the sub-switching element by the respective control circuits, thereby rectifying, smoothing and supplying a voltage generated at a secondary coil to a load. A primary-side coil of the transformer and the main control circuit turn on and off the main switching element so that the direct current voltage supplied to the load is constant with a voltage of a primary auxiliary coil as a signal voltage, and the sub-control circuit turns on the sub-switching element when a both-end voltage of the sub-switching element is lowered to a reference voltage or lower.

However, when the snubber circuit is configured in a passive manner, the surge voltage is changed into heat energy, which is then consumed. Thus, each part is enlarged and power supply efficiency is decreased. Alternatively, when the snubber circuit is configured in an active clamp manner, the surge voltage can be power-regenerated, so that the efficiency is not decreased. However, it is difficult to acquire an optimal on-off timing of a power element.

In JP-A-2006-129548, the both-end voltage of the sub-switching element is detected, and the sub-switching element is turned on when the voltage is lowered to a reference voltage or lower. Hence, loss is always caused due to a resistance detecting the both-end voltage of the sub-switching element, so that power consumption is increased during the standby such as unload or light load. JP-A-2006-129548 also discloses a method of adding a coil for signal to the transformer to acquire an on-off timing of the sub-switching element. However, since an extra tap is required for the transformer, spaces between the respective coils are necessary, so that a structure of the transformer is complicated and an outward size of the transformer should be enlarged.

SUMMARY OF THE INVENTION

Considering the above problems, an object of the invention is to provide an active snubber circuit and a power supply circuit that enable an optimal on-off timing of a sub-switching element to be easily obtained, providing no coil for signal to a transformer to prevent a structure of the transformer from being complicated and suppressing increase of power consumption during standby of a power source.

In order to achieve the above object, an active snubber circuit and a power supply circuit of the invention are configured as described below.

According to a first aspect of the invention, there is provided an active snubber circuit for a switching power supply comprising: a transformer; a main switching element that is serially connected to a primary coil in the transformer, wherein the main switching element repeatedly operates an on-off operation so that current intermittently flows in the primary coil; a capacitor for surge voltage absorption; a sub-switching element; and a sub-control circuit for controlling the sub-switching element, wherein a circuit, in which the capacitor for surge voltage absorption and the sub-switching element are connected in series, is connected in parallel with the primary coil, and wherein the sub-control circuit is configured to turn on the sub-switching element for a predetermined time period just after the main switching element is off.

According to a second aspect of the invention, the active snubber circuit further comprises a bootstrap circuit, wherein a signal from the bootstrap circuit is input to the sub-control circuit.

According to a third aspect of the invention, a power supply circuit comprising: a main switching element for a main switching operation for power transmission; a main transformer for power transmission; a sub-switching element that is connected in parallel with a main coil for excitation of the main transformer for power transmission; a capacitor that is serially connected to the sub-switching element; the active snubber circuit that clamps a switching pulse voltage applied to the main switching element; and a bootstrap circuit for acquiring an on-off signal of the sub-switching element.

According to a fourth aspect of the invention, in the power supply circuit, wherein the bootstrap circuit for acquiring an on-off signal of the sub-switching element is commonly used to a bootstrap circuit for a power source of the sub-control circuit through a diode.

According to the aspects of the invention, it is possible to provide an active snubber circuit and a power supply circuit enabling an optimal on-off timing of a sub-switching element to be easily obtained, having a simple transformer and capable of reducing surge current and noise.

DETAILED DESCRIPTION OF THE PREFERRED EMBODIMENTS

Hereinafter, preferred illustrative embodiments of the invention will be described.

Figure 1:
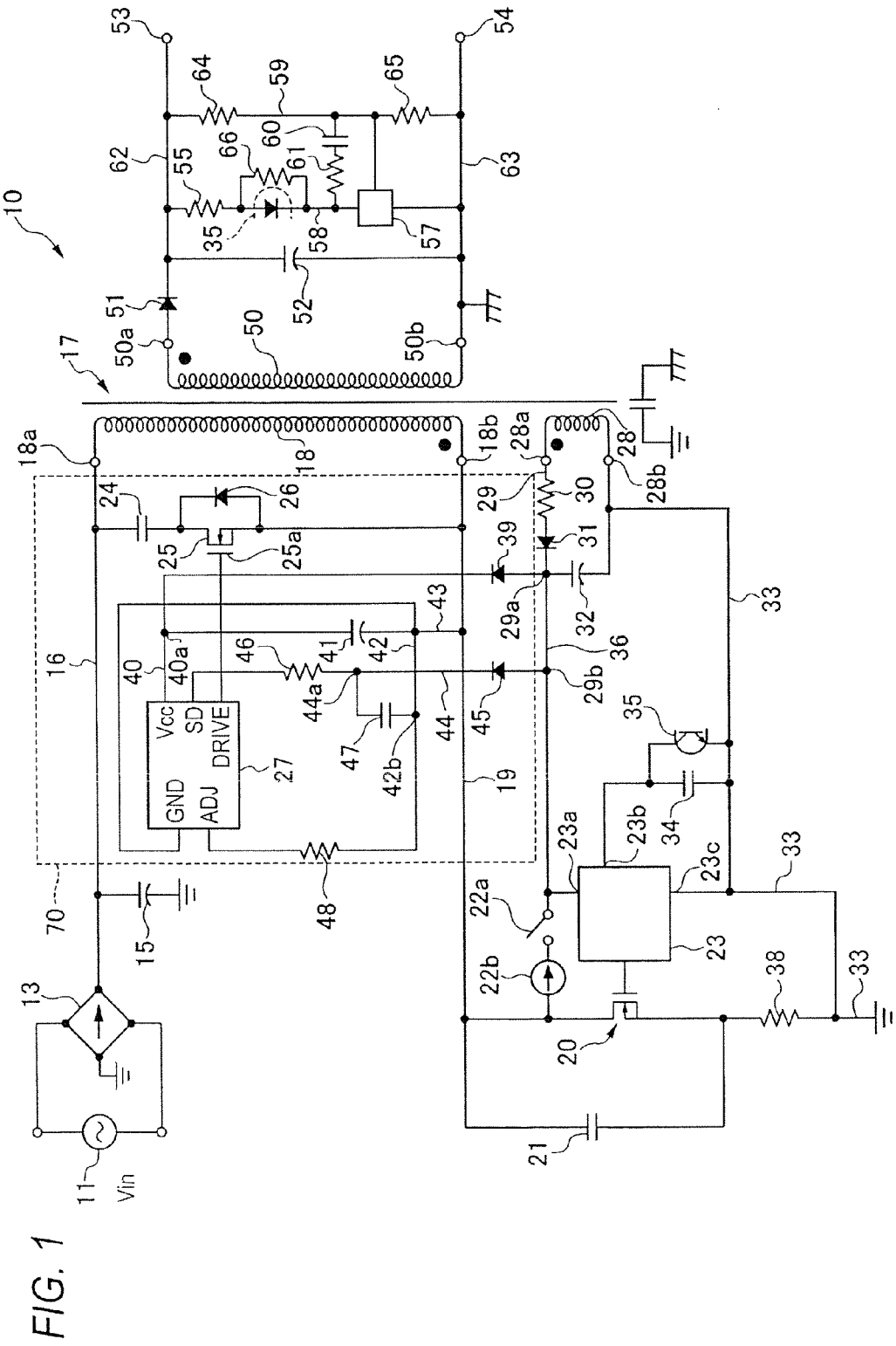
FIG. 1 is a circuit diagram showing a switching power supply circuit using an active snubber circuit according to an illustrative embodiment of the invention.

FIG. 1 is a circuit diagram showing a switching power supply circuit using an active snubber circuit according to an illustrative embodiment of the invention. In a switching power supply circuit 10 shown in FIG. 1, an alternating current (AC) voltage from an input power source 1 is supplied to a diode rectification bridge 13 and the rectified voltage is smoothed in a capacitor 15 for smoothing and then taken out as a smoothed direct current (DC) voltage. A line 16 to which the smoothed DC voltage is supplied is connected to one end 18a of a primary-side main coil 18 for excitation of a main transformer 17 for power transmission. The other end 18b of the primary-side main coil 18 is connected to a line 19.

The other end 18b of the primary-side main coil 18 is connected to a drain terminal of a main switching element 20 by the line 19 and a capacitor 21 is provided between the drain terminal and a source terminal of the main switching element 20. The main switching element 20 is on-off controlled by a main control circuit 23. The source terminal of the main switching element 20 is grounded via an overcurrent detection resistance 38. The main switching element 20 is serially connected to the primary-side main coil.

A capacitor 24 and a sub-switching element 25 are serially connected between one end 18a and the other end 18b of the primary-side main coil 18. That is, a circuit in which the capacitor 24 and the sub-switching element 25 are connected in series is connected in parallel with the primary-side main coil 18. Incidentally, a diode 26 is a parasitic diode that is embedded in the sub-switching element 25. The sub-switching element 25 is on-off controlled by a sub-control circuit 27.

In addition, the main transformer 17 for power transmission has a primary-side coil 28. A terminal 28a of the primary-side coil 28 is connected with a line 29 and a terminal 28b of the primary-side coil 28 is connected with a line 33. The line 29 is connected to one end of a resistance 30, and the other end of the resistance 30 is connected with an anode terminal of a diode 31. A cathode terminal of the diode 31 is connected to a line 36. The line 36 is connected with a terminal 23a of the main control circuit 23, and a capacitor 32 is connected between the line 36 and the line 33. In addition, the line 36 is connected with one end of a switch 22a and the other end of the switch 22a is connected with a current source 22b. The switch 22a becomes on when the power supply starts up and thus current of the current source 22b is supplied and charged to the capacitor 32. After starting the on-off control of the main switching element, the switch 22a becomes off by the main control circuit 23.

The line 33 is connected with one end of a capacitor 34 and the other end of the capacitor 34 is connected to a terminal 23b of the main control circuit 23. In addition, light receiving-side terminals (collector and emitter terminals of a phototransistor) of a photo coupler 35 are connected in parallel with the capacitor 34. Additionally, the line 33 is connected with a terminal 23c of the main control circuit 23 and one end of the resistance 38 and is grounded.

The line 36 is connected with an anode terminal of a diode 39 and a cathode terminal of the diode 39 is connected to a line 40. The line 40 is connected to a Vcc terminal of the sub-control circuit 27. In addition, the line 40 is connected with one end of a capacitor 41 and the other end of the capacitor 41 is connected to the line 19 via a line 42 and a line 43.

In addition, the line 36 is connected with an anode terminal of a diode 45 and a cathode terminal of the diode 45 is connected to a line 44. The line 44 is connected with one end of a resistance 46 and the other end of the resistance 46 is connected to an SD terminal of the sub-control circuit 27. A capacitor 47 is connected between the line 44 and the line 42. In addition, the line 42 is connected with one end of a resistance 48 and the other end of the resistance 48 is connected to an ADJ terminal of the sub-control circuit 27. A Drive terminal of the sub-control circuit 27 is connected to a gate terminal 25a of the sub-switching element 25 and the sub-switching element 25 is on-off controlled by the sub-control circuit 27.

One end 50a of a secondary-side coil 50 of the main transformer 17 for power transmission is connected with an anode terminal of a diode 51 for rectification and a cathode diode of the diode 51 is connected to a line 62. The other end 50b of the secondary-side coil 50 is connected with a line 63. The line 62 is connected with one end of a capacitor 52 for smoothing and the other end of the capacitor 52 is connected to the line 63. The line 62 is provided with an output terminal (positive terminal) 53 and the line 63 is provided with an output terminal (negative terminal) 54. In addition, a resistance 55, a light emitting-side terminal of the photo coupler 35 and an output terminal of an error amplifier 57 are serially connected between the line 62 and the line 63. Additionally, a capacitor 60 and a resistance 61 are serially connected between a line 58 and a line 59. Further, resistances 64, 65 are serially connected between the lines 62, 63 and a connection point thereof is connected, as the line 59, to an input terminal of the error amplifier 57. The photo coupler 35 is connected in parallel with a resistance 66. A voltage between terminals of the resistance 66 is supplied, as a signal, to the main control circuit 23 through the photo coupler 35, and a driving signal that arbitrarily controls the on-off operation of the main switching element 20 depending on the signal voltage is formed. Thereby, the output voltages taken out from the output terminals 53, 54 are stabilized.

In other words, in the main control circuit 23, a driving signal in which off time Toff of the main switching element 20 is fixed and an operation oscillation frequency is variable is formed so that an output voltage is constant. When the driving signal is supplied to the main switching element 20, alternating current flows in the primary-side main coil 18 of the main transformer 17 for power transmission, so that excitation is performed, and power is transmitted to the secondary-side coil 50, so that a voltage is formed at the secondary-side coil 50 depending on a winding ratio of the primary-side main coil 18 and the secondary-side coil 50. In addition, the driving signal is controlled so that the output voltage is stabilized.

In the switching power supply circuit 10, the capacitor 24, the sub-switching element 25 serially connected to the capacitor 24, the parasitic diode 26 embedded in the sub-switching element 25, the sub-control circuit 27 driving the sub-switching element 25, the lines 40, 44 connected to the sub-control circuit 27 from the line 36 through the diodes 39, 45, the capacitor 41, the capacitor 47 and the resistance 46 configure an active snubber circuit 70.

In addition, the diodes 39, 45 connected to the line 36 and the capacitors 41, 47 configure a bootstrap circuit.

The active snubber circuit 70 is connected in parallel with the primary-side main coil 18.

As described above, in this circuit, the bootstrap circuit is used to acquire an on-off signal of the sub-switching element 25 that is a power element for active clamp. While the voltage of the capacitor 32, which is a control power source used for the on-off control of the main switching element 20, is supplied to the sub-control circuit 27 from the bootstrap circuit, an on-off timing of the main switching element 20 is detected depending on whether or not a voltage from the capacitor 32. Thereby, it is possible to simply acquire an on-off signal of the sub-switching element 25 without providing a coil tap for signal to the transformer and detecting a both-end voltage of the sub-switching element.

In this circuit, the on timing of the sub-switching element 25 is a predetermined on time period just after the main switching element 20 is off. Conventionally, a tap or auxiliary coil is provided to a primary coil of a transformer or a both-end voltage of the sub-switching element 25 is detected to acquire an on-off timing signal or gate signal of the sub-switching element 25. However, according to the invention, the on-off timing of the sub-switching element 25 is generated depending on whether power is supplied to the bootstrap circuit by the on-off timing of the main switching element 20.

Figure 2:
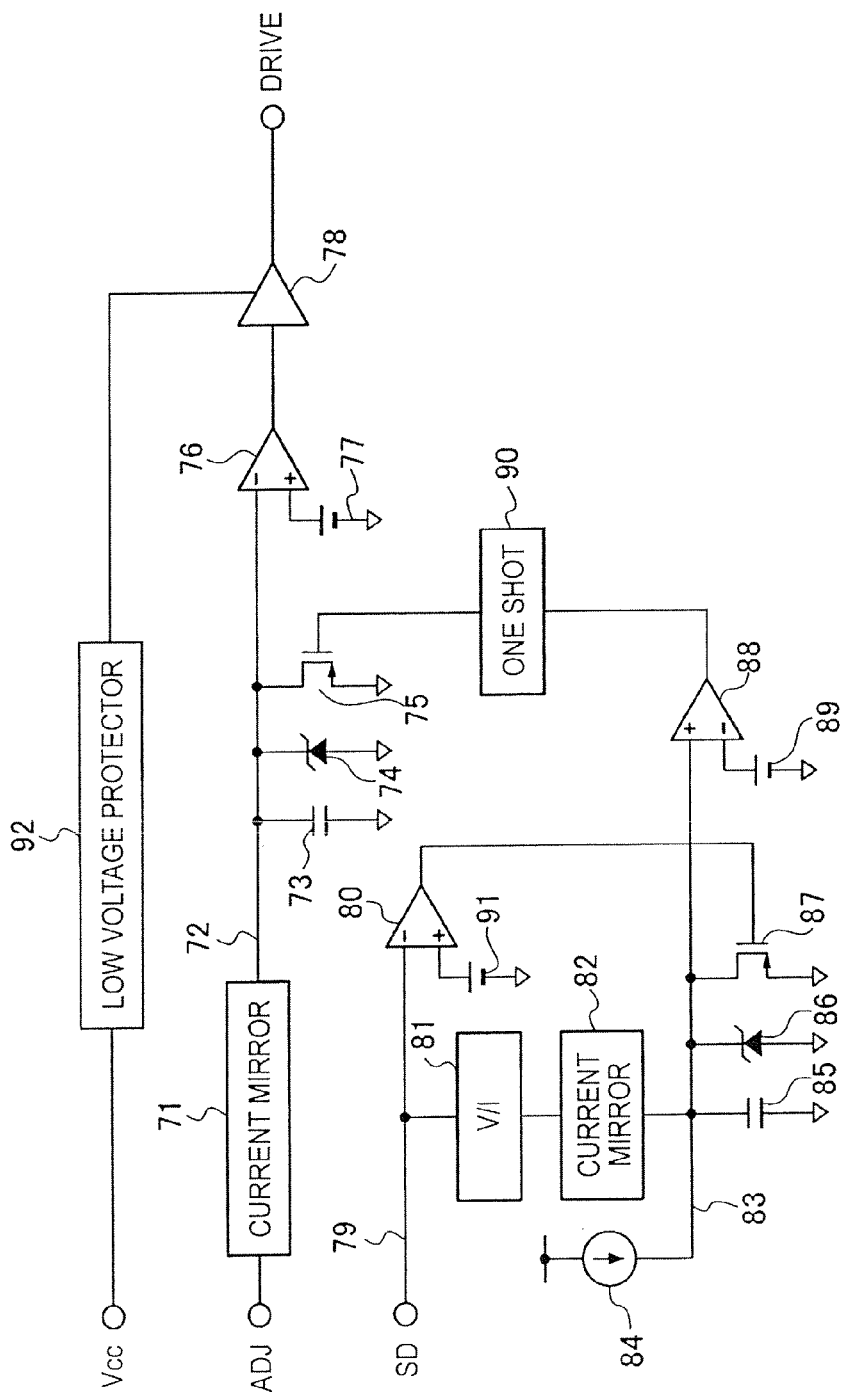
FIG. 2 is a block diagram of a sub-control circuit of the active snubber circuit according to an illustrative embodiment of the invention.

FIG. 2 is a detailed block diagram showing the configuration of the sub-control circuit 27. The ADJ terminal is connected with an input side of a current mirror circuit 71, and an output side of the current mirror circuit 71 is connected with a line 72. The line 72 is connected with one ends of a capacitor 73, a Zener diode 74 and a transistor 75. The line 72 is connected to an inverting input terminal of a comparator 76. A non-inverting input terminal of the comparator 76 is connected with a power source 77 for threshold voltage Vth2. An output of the comparator 76 is input to a driver circuit 78 and an output of the driver circuit 78 is output from the Drive terminal. The current mirror circuit 71, the capacitor 73, the Zener diode 74 and the transistor 75 configure a timer.

The SD terminal is input to an inverting input terminal of a comparator 80 by a line 79. The line 79 is connected with an input-side terminal of a voltage-current converter 81, an output-side terminal of the voltage-current converter 81 is connected with an input-side terminal of a current mirror circuit 82 and an output-side terminal of the current mirror circuit 82 is connected to a line 83. The line 83 is connected with a current source 84 and one ends of a capacitor 85, a Zener diode 86 and a transistor 87. The line 83 is connected to a non-inverting input terminal of a comparator 88. An inverting input terminal of the comparator 88 is connected to a power source 89. In addition, an output of the comparator 88 is input to a one-short circuit 90 and an output of the one-short circuit 90 is input to a gate of the transistor 75. Additionally, a non-inverting input terminal of the comparator 80 is connected to a power source 91 and an output thereof is input to a gate of the transistor 87. The current source 84, the capacitor 85, the Zener diode 86 and the transistor 87 configure a timer.

The Vcc terminal is connected with an input terminal of a low voltage protector 92 and an output terminal of the low voltage protector 92 is connected to a control terminal of the driver circuit 78. The low voltage protector 92 supplies a signal for driving the drive circuit when a voltage input from the Vcc terminal is a predetermined voltage or higher. When a voltage input from the Vcc terminal is lower than a predetermined voltage, the low voltage protector supplies a signal disabling the driver circuit 78.

In the followings, an operation of the active snubber circuit 70 according to this illustrative embodiment will be described with reference to an operation timing chart of FIG. 3. FIG. 3(a) shows a voltage VDS waveform between both ends of the main switching element, FIG. 3(b) shows a voltage waveform of the SD terminal, FIG. 3(c) shows a voltage of the line 72 connected to the timer comprised of the capacitor 85, the Zener diode 86 and the transistor 87, FIG. 3(d) shows a timeout output of the timer comprised of the capacitor 85, the Zener diode 86 and the transistor 87 (a timeout value tout is set to be a predetermined value, for example 3 μs), FIG. 3(e) shows an output signal from the one-short circuit 90, FIG. 3(f) shows a signal f-2 (signal of the line 72) of the timer comprised of the capacitor 73, the Zener diode 74 and the transistor 75 and FIG. 3(g) shows an output signal from the driver circuit 78.

Figure 3:
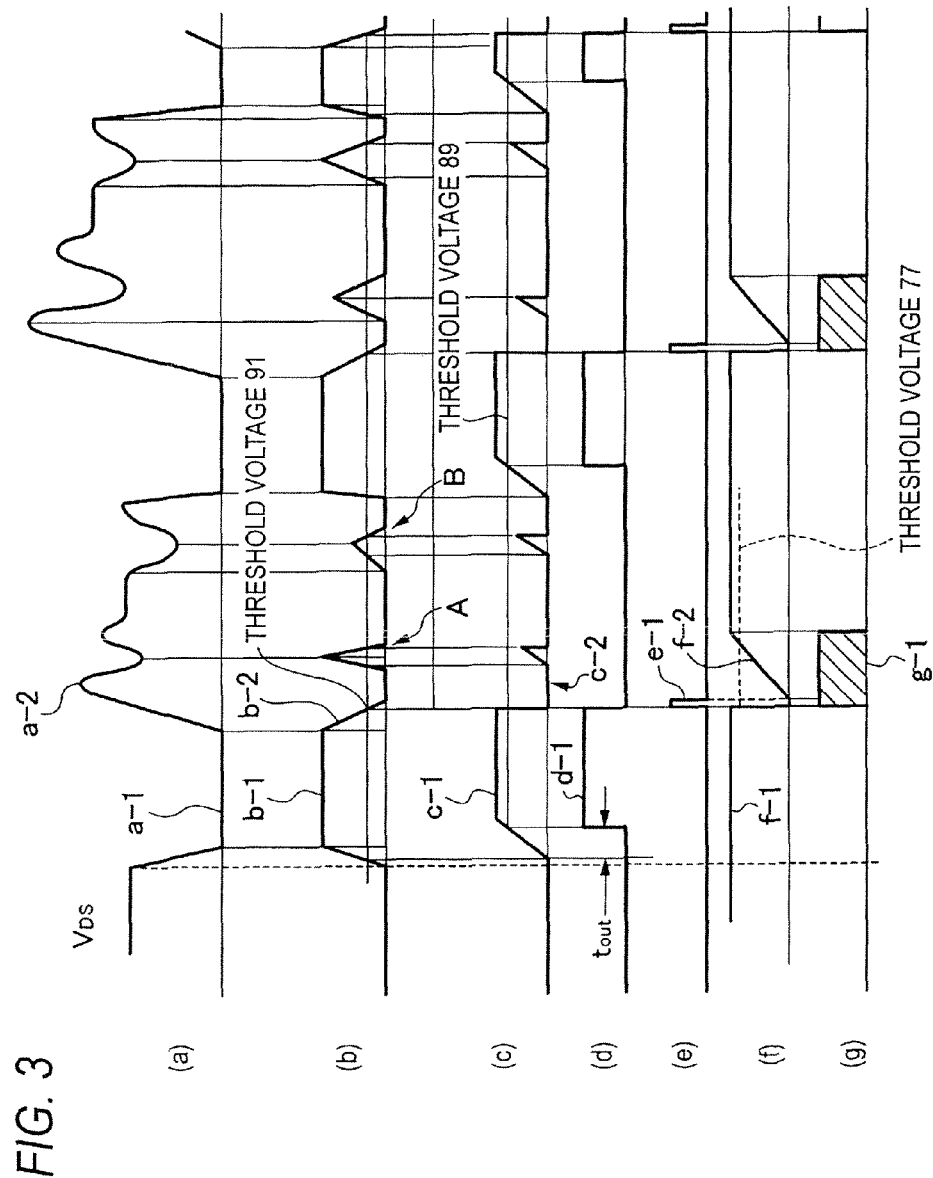
FIG. 3 shows waveforms of each part of the active snubber circuit according to an illustrative embodiment of the invention.

First, when the main switching element 20 becomes on, the voltage VDS between the drain and the source of the main switching element 20 becomes zero (FIG. 3(*a*-1)). At this time, the voltage VSD of the SD terminal of the sub-control circuit 27 becomes a high level (FIG. 3(*b*-1)). Then, the voltage VSD is converted into current in the voltage-current converter 81 of the sub-control circuit 27 shown in FIG. 2 and the capacitor 85 is charged through the current mirror circuit 82, so that the voltage becomes a high level (FIG. 3(*c*-1)). In addition, a potential (potential of the line 83) of an output of the timer comprised of the capacitor 85, the Zener diode 86 and the transistor 87 becomes a high level (FIG. 3(*d*-1)). In addition, the voltage of the line 72 also becomes a high level (FIG. 3(*f*-1)).

Then, when the main switching element 20 becomes on, a potential of terminals 29*a*, 29*b* is more increased than a potential of the path 40 of the sub-control circuit 27. Thereby, the capacitor 41 is charged through the diode 39. A potential of the Vcc terminal of the sub-control circuit 27 becomes a high level. As the potential of the Vcc terminal becomes a high level, the low voltage protector 92 operates to supply an operation permitting signal to the driver circuit 78, so that the driver circuit 78 becomes under an operable state. In addition, when the main switching element 20 becomes off, surge is generated in the voltage VDS between the drain and the source of the main switching element 20 (FIG. 3(*a*-2)). At this time, the voltage VSD of the SD terminal is reduced to zero (FIG. 3(*b*-2)). When the voltage becomes a threshold voltage 91 or lower, the comparator 80 supplies a signal, which turns on the transistor 87, to the gate of the transistor 87. Thereby, the charges of the capacitor 85 are discharged, so that the potential of the line 83 is lowered to zero (FIG. 3(*c*-2)). When the voltage of the inverting input terminal becomes a threshold voltage 90 or lower, the comparator 88 outputs a high-level signal to the one-short circuit 90, and the one-short circuit 90 outputs a pulse signal of 500 nsec, for example, to the gate of the transistor 75 (FIG. 3(*e*-1)). Thereby, the capacitor 73 is discharged and is again charged after the one-short pulse signal disappears (FIG. 3(*f*-2)). At this time, when the voltage of the inverting input terminal is a threshold voltage (voltage of the power source 77) or lower, the comparator 76 supplies a signal to the driver circuit 78. Thereby, the driver circuit 78 operates only during a time period shown in FIG. 3(*g*-1) and turns on the sub-switching element 25. Here, during the off time period of the main switching element 20, the voltage VDS as the surge voltage is varied. When the voltage is lowered to a predetermined value or lower, the voltage of the SD terminal rises only for a short time period, as shown with A and B in FIG. 3. However, since the time period is shorter than the time tout set as the timeout, the time period is ignored and does not appear in the waveform shown in FIG. 3(*d*).

Figure 4:
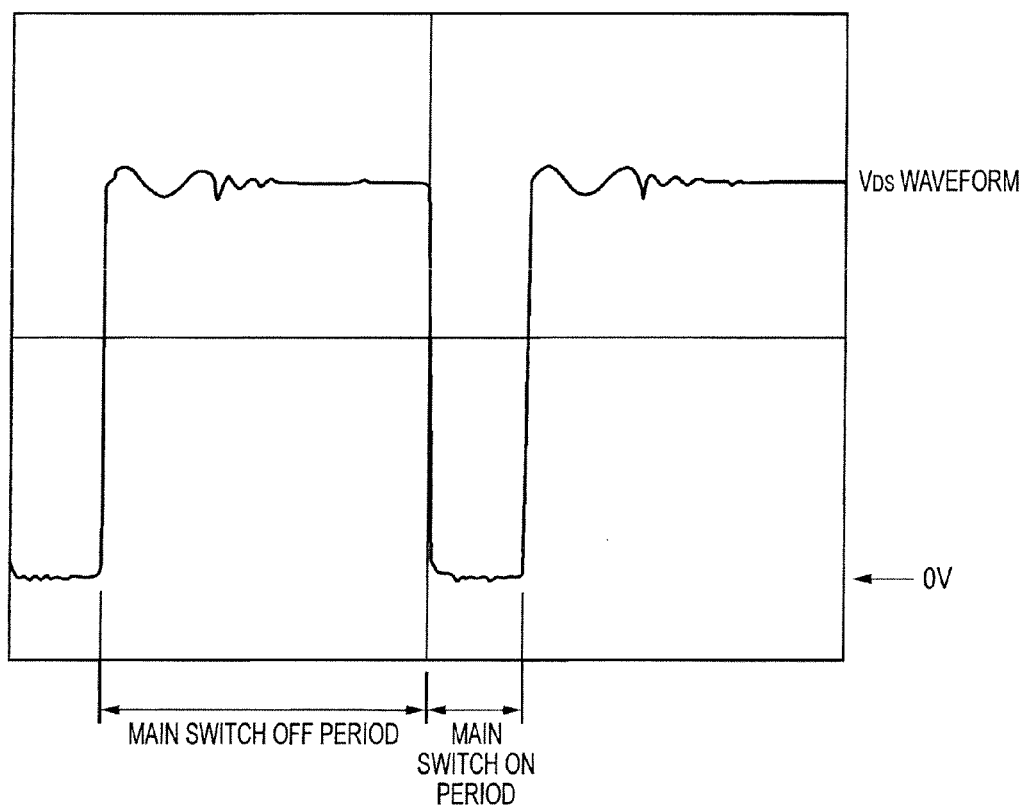
FIG. 4 shows a waveform of a voltage between a source and a drain of a main switching element.

As described above, during the time period for which the voltage VSD of the SD terminal rises from 0V to the threshold voltage 77, the sub-switching element 25 becomes on. This means that the sub-switching element 25 becomes on at the timing at which the surge voltage is generated. At this time, the surge energy generated at the primary-side main coil 18 is absorbed by the capacitor 24. In other words, when the main switching element 20 becomes an opened state from a conduction state, the energy accumulated in the leakage inductance of the primary-side main coil 18 of the transformer 17 for power transmission is enabled to flow as current through the capacitor 24 and the sub-switching element 25, so that the surge voltage is further suppressed. FIG. 4 schematically shows a waveform of a voltage between the source and the drain of the main switching element 20 of this illustrative embodiment. As can be seen from FIG. 4, it is possible to reduce the surge current or noise by the active snubber circuit of this illustrative embodiment.

As described above, it is possible to provide an active snubber circuit enabling an optimal on-off timing of a sub-switching element to be easily obtained, having a simple transformer and capable of reducing surge current or noise.

Figure 5:
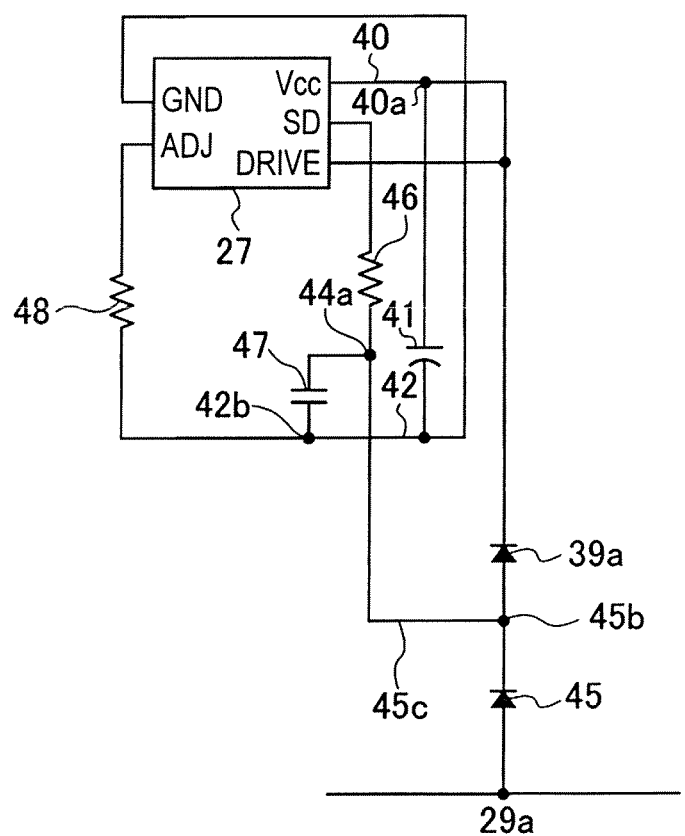
FIG. 5 is a part of a circuit diagram showing a modified embodiment.
Figure 6:
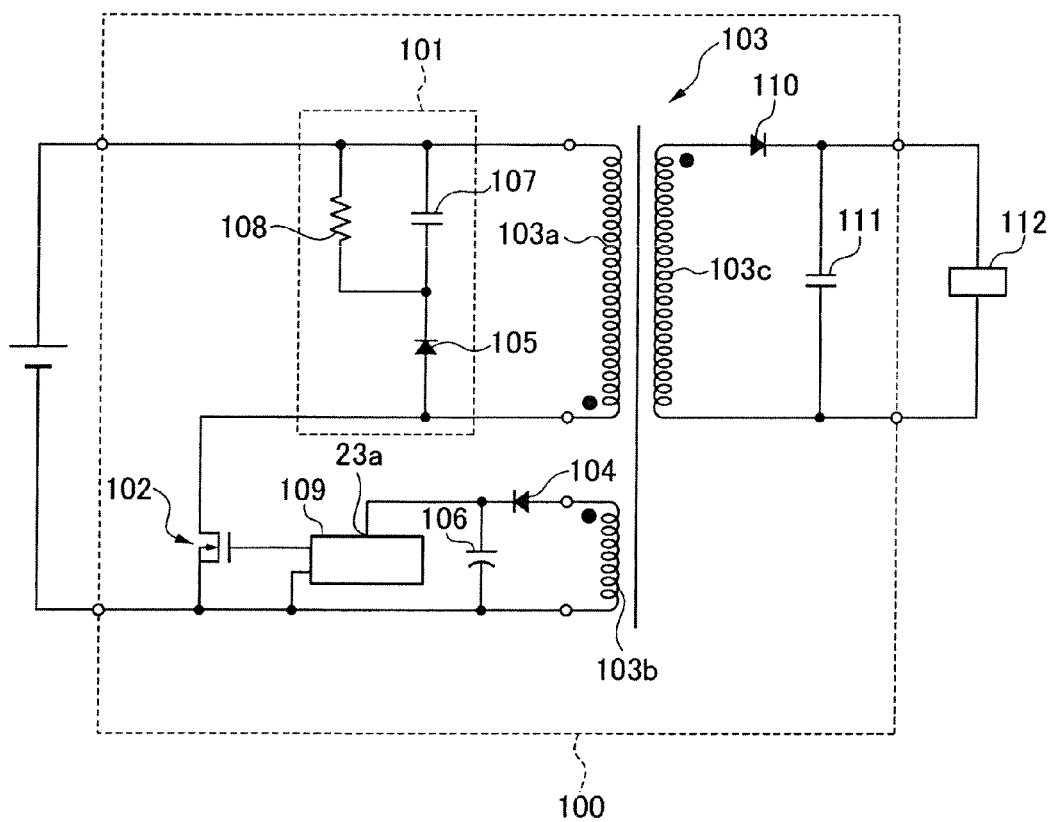
FIG. 6 is a circuit diagram of a related-art circuit using an RCD snubber circuit.
Figure 7:
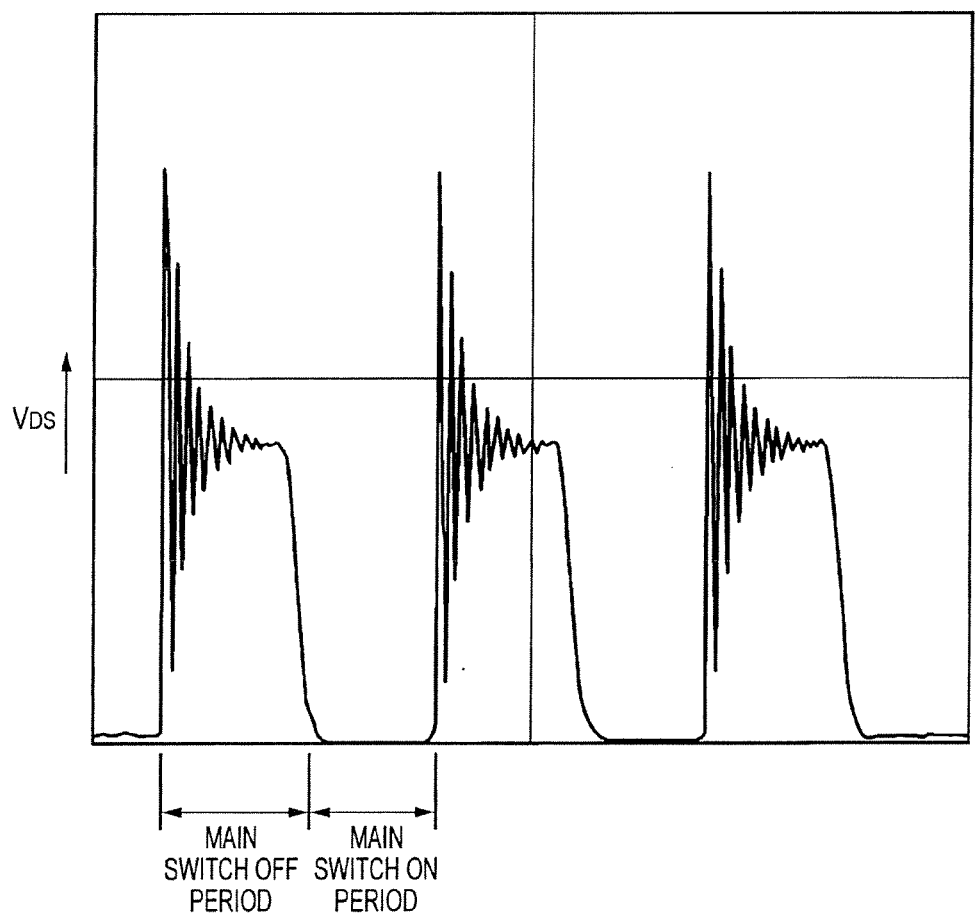
FIG. 7 shows a surge voltage in the related-art circuit in which the RCD snubber circuit is used.

In the above-described illustrative embodiment, the diode 39 is connected to the terminal 29*a* and the diode 45 is connected to the terminal 29*b*. However, as shown in FIG. 5, two diodes 45, 39*a* may be serially connected to the terminal 29*a*, and a line 45*c* branching from a terminal 45*b* may be connected to a terminal 44*a*. By doing so, it is possible to use the diode 39*a* having low pressure-resistance. In the above-described illustrative embodiment, the active snubber circuit is applied to the flyback converter power supply. However, the invention is not limited thereto. For example, the active snubber circuit may be applied to a general power supply.

The configurations, shapes, sizes and arrangements in the above-described illustrative embodiments have been schematically shown so as to understand and implement the invention. In addition, the numerical values and the compositions (materials) of the respective configurations are just exemplary. Accordingly, the invention is not limited to the illustrative embodiments and can be variously changed without departing from the scope of the technical spirit defined in the claims.

The active snubber circuit and the power supply circuit of the invention can be used as a snubber circuit and a power supply circuit for a switching power supply.

What is claimed is:

1. An active snubber circuit for a switching power supply, the switching power supply comprising:
    a transformer having a primary-side main coil and a secondary-side coil;
    a main switching element that is serially connected to the primary-side main coil in the transformer; and
    a control power source configured to operate an on-off operation of the main switching element,
    wherein the main switching element repeatedly operates the on-off operation so that current intermittently flows in the primary-side main coil,
    the active snubber circuit comprising:
        a capacitor for surge voltage absorption;
        a sub-switching element;
        a sub-control circuit, separate from a main control circuit for controlling operation of the control power source, for controlling the sub-switching element, wherein the sub-control circuit receives a voltage from the control power source and controls an on-off signal of the sub-switching element based on whether the received voltage from the control power source exceeds a predetermined value; and
    a bootstrap circuit for supplying a voltage of the control power source from the primary-side of the transformer to the sub-control circuit, wherein the bootstrap circuit acquires an on-off signal of the sub-switching element based on whether power is supplied to the bootstrap circuit by the on-off operation of the main switching element,
    wherein a circuit, in which the capacitor for surge voltage absorption and the sub-switching element are connected in series, is connected in parallel with the primary-side main coil, and
    wherein the sub-control circuit is configured to:

detect an on-off timing of the main switching element depending on the voltage of the control power source supplied from the bootstrap circuit; and turn on the sub-switching element for a predetermined time period after the main switching element is off.

2. The active snubber circuit according to claim 1, wherein the bootstrap circuit further supplies power to a power input of the sub-control circuit through a diode.

3. The active snubber circuit according to claim 1,
wherein the sub-control circuit is configured to turn on the sub-switching element at which the surge voltage is generated after turning off the main switching element.

4. The active snubber circuit according to claim 1,
wherein the main switching element is directly connected to the main control circuit.

5. An active snubber circuit for a switching power supply, the switching power supply including: a transformer having a primary-side main coil and a secondary-side coil; a main switch, which is serially connected to the primary-side main coil in the transformer, and which is directly connected to a main control circuit; and a power source configured to operate an on-off operation of the main switch, wherein the main switch repeatedly operates the on-off operation so that current intermittently flows in the primary-side main coil, the active snubber circuit comprising:

a series circuit capable of being connected in parallel with the primary-side coil of the transformer, comprising:
a capacitor for surge voltage absorption; and
a sub switch connected in series with the capacitor;
a sub-control circuit for controlling the sub switch, wherein the sub-control circuit receives a voltage from the power source and controls an on-off signal of the sub switch based on whether the received voltage from the power source exceeds a predetermined value; and a bootstrap circuit capable of supplying a voltage of the power source to the sub-control circuit, the bootstrap circuit supplying power from said primary-side of said transformer, wherein the bootstrap circuit acquires an on-off signal of the sub switch based on whether power is supplied to the bootstrap circuit by the on-off operation of the main switch;

wherein the control circuit is configured to:
detect an on-off timing of a coil switch for switching the primary-side coil of the transformer depending on the voltage of the power source supplied from the bootstrap circuit; and turn on the switch for a predetermined time period just after the coil switch turns off.

6. The active snubber circuit according to claim 5, wherein the bootstrap circuit further supplies power to a power input of the sub-control circuit through a diode.

7. The active snubber circuit according to claim 5, wherein the power source comprises a power source of a main control circuit for controlling the coil switch.

8. The active snubber circuit according to claim 5, further comprising a power supply circuit that comprises:
the power source; and
the transformer having the coil coupled to the power source.

* * * * *